(12) United States Patent
Lin et al.

(10) Patent No.: US 12,461,243 B2
(45) Date of Patent: Nov. 4, 2025

(54) LIDAR WITH SWITCHABLE LOCAL OSCILLATOR SIGNALS

(71) Applicant: Aurora Operations, Inc., Pittsburgh, PA (US)

(72) Inventors: Sen Lin, Santa Clara, CA (US); Andrew Steil Michaels, Santa Clara, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/404,620

(22) Filed: Jan. 4, 2024

(65) Prior Publication Data

US 2024/0219574 A1    Jul. 4, 2024

Related U.S. Application Data

(63) Continuation of application No. 17/750,247, filed on May 20, 2022, now abandoned.

(51) Int. Cl.
 G01S 17/931      (2020.01)
 G01S 7/484       (2006.01)
 G01S 7/4863      (2020.01)

(52) U.S. Cl.
 CPC ............ G01S 17/931 (2020.01); G01S 7/484 (2013.01); G01S 7/4863 (2013.01)

(58) Field of Classification Search
 CPC .... G01S 7/4808; G01S 7/4811; G01S 7/4815; G01S 7/4816; G01S 7/4818; G01S 7/484; G01S 7/486; G01S 7/4863; G01S 17/931
 See application file for complete search history.

(56) References Cited

U.S. PATENT DOCUMENTS

| | | | |
|---|---|---|---|
| 4,986,653 | A | 1/1991 | Yokokura et al. |
| 8,988,754 | B2 | 3/2015 | Sun et al. |
| 9,316,534 | B1 | 4/2016 | Kondratko et al. |
| 9,476,981 | B2 | 10/2016 | Yaacobi et al. |
| 10,338,321 | B2 | 7/2019 | Hosseini et al. |
| 10,627,517 | B2 | 4/2020 | Yaacobi et al. |

(Continued)

FOREIGN PATENT DOCUMENTS

| | | |
|---|---|---|
| CN | 105026970 | 1/2014 |
| CN | 104509011 A | 4/2015 |

(Continued)

OTHER PUBLICATIONS

Co-pending U.S. Appl. No. 17/531,029, inventors Sen Lin et al., filed Nov. 19, 2021.

(Continued)

Primary Examiner — Yuqing Xiao
Assistant Examiner — Zhengqing Qi
(74) Attorney, Agent, or Firm — Dority & Manning, P.A.

(57) ABSTRACT

A light detection and ranging (LIDAR) sensor system includes a plurality of LIDAR pixels and a local oscillator module. The local oscillator module is coupled to the plurality of LIDAR pixels. The local oscillator module includes a first local oscillator input configured to receive a first local oscillator signal and a second local oscillator input configured to receive a second local oscillator signal. The local oscillator module is configured to provide the first local oscillator signal or the second local oscillator signal to a first LIDAR pixel of the plurality of LIDAR pixels.

20 Claims, 11 Drawing Sheets

(56) References Cited

U.S. PATENT DOCUMENTS

| | | |
|---|---|---|
| 10,761,272 B2 | 9/2020 | Hosseini et al. |
| 11,150,411 B2 | 10/2021 | Hosseini et al. |
| 11,372,106 B2 | 6/2022 | Yaacobi et al. |
| 2014/0036252 A1 | 2/2014 | Amzajerdian et al. |
| 2016/0377721 A1 | 12/2016 | Lardin et al. |
| 2018/0267250 A1 | 9/2018 | Hosseini et al. |
| 2019/0064332 A1 | 2/2019 | Schmalenberg et al. |
| 2019/0154810 A1 | 5/2019 | Tanemura et al. |
| 2019/0391243 A1* | 12/2019 | Nicolaescu ............ G01S 17/42 |
| 2020/0088876 A1* | 3/2020 | Tanemura ............... G01S 7/006 |
| 2020/0116837 A1* | 4/2020 | Aghari .................. G01S 7/4804 |
| 2020/0292745 A1* | 9/2020 | Waldern ............... G02B 6/0068 |
| 2020/0400798 A1 | 12/2020 | Rezk et al. |
| 2021/0055391 A1 | 2/2021 | LaChapelle et al. |
| 2021/0055694 A1 | 2/2021 | Chan et al. |
| 2021/0141058 A1* | 5/2021 | Piggott ................. G01S 7/4817 |
| 2021/0181309 A1* | 6/2021 | Oza ....................... G01S 7/4802 |
| 2021/0263147 A1 | 8/2021 | Bauer et al. |
| 2021/0382142 A1 | 12/2021 | Rogers et al. |
| 2021/0405203 A1 | 12/2021 | Barber et al. |
| 2022/0003937 A1 | 1/2022 | Hosseini et al. |
| 2022/0011409 A1 | 1/2022 | Hosseini et al. |
| 2022/0043149 A1 | 2/2022 | LaChapelle |
| 2022/0128666 A1* | 4/2022 | Schrans ................. G02F 1/292 |
| 2022/0137198 A1* | 5/2022 | Hamidi ................ G01S 7/4913 |
| | | 356/4.01 |
| 2022/0171072 A1 | 6/2022 | Barber et al. |
| 2022/0244360 A1 | 8/2022 | Phare et al. |
| 2022/0334227 A1 | 10/2022 | Davydenko |
| 2022/0365190 A1 | 11/2022 | Nathan et al. |
| 2022/0373688 A1* | 11/2022 | Seok ..................... G01S 7/4818 |

FOREIGN PATENT DOCUMENTS

| | | | |
|---|---|---|---|
| CN | 113330694 A | 8/2021 | |
| EP | 2929382 | 1/2014 | |
| JP | 6363619 | 1/2014 | |
| KR | 102181537 | 1/2014 | |
| KR | 102350191 | 1/2014 | |
| WO | WO 2016/024332 | 2/2016 | |
| WO | WO 2021116766 | 6/2021 | |
| WO | WO-2021116766 A1 * | 6/2021 | .......... A61B 5/0059 |
| WO | WO 2021/174087 | 9/2021 | |

OTHER PUBLICATIONS

Co-pending U.S. Appl. No. 17/542,459 inventors James Ferrara et al., filed Dec. 5, 2021.

Co-pending U.S. Appl. No. 17/558,476 inventors Sen Lin et al., filed Dec. 21, 2021.

* cited by examiner

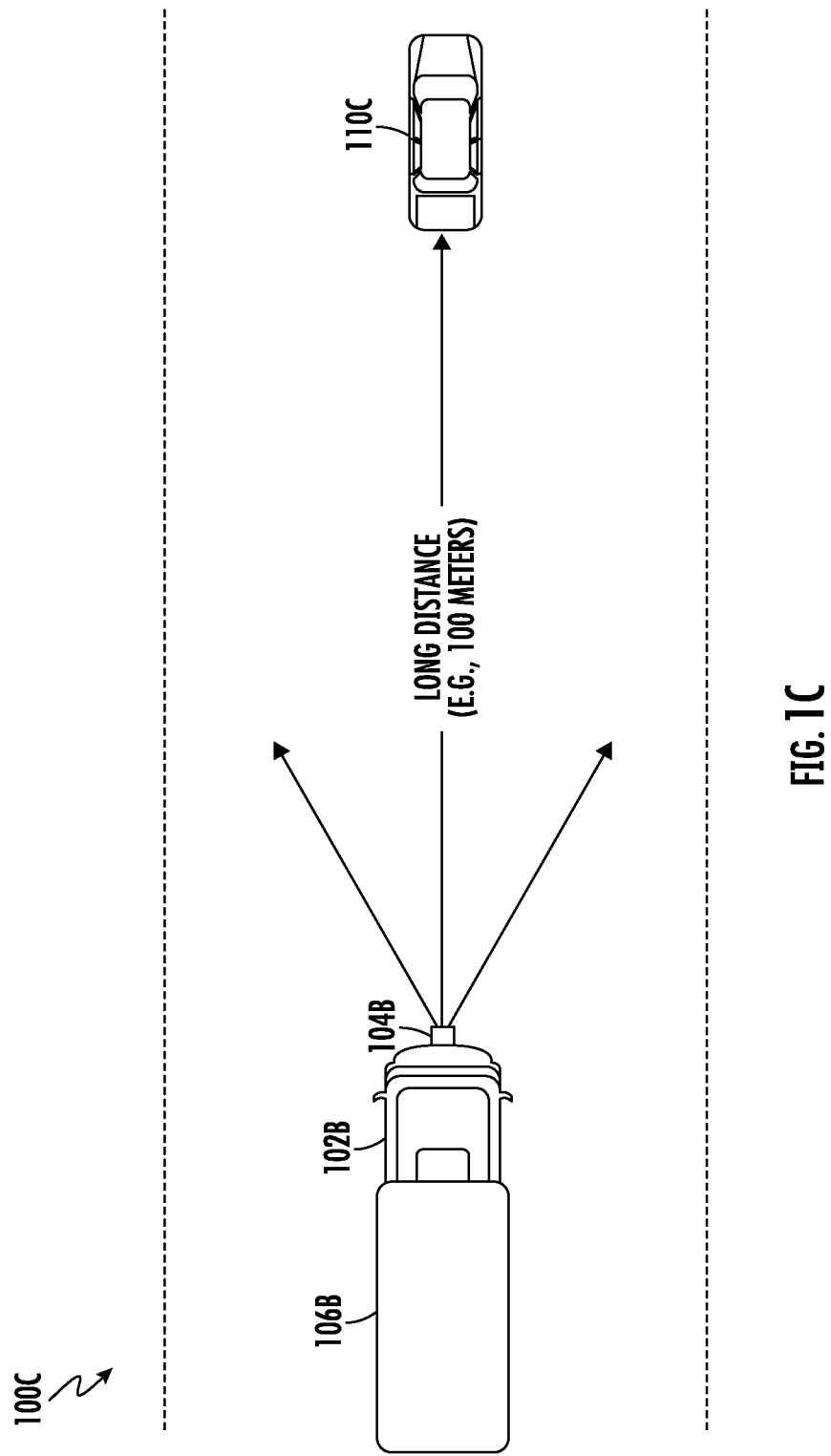

LIDAR WITH SWITCHABLE LOCAL OSCILLATOR SIGNALS

PRIORITY CLAIM

The present application is a continuation of Ser. No. 17/750,247, filed on May 20, 2022, which is incorporated by reference herein.

BACKGROUND INFORMATION

Frequency Modulated Continuous Wave (FMCW) light detection and ranging (LIDAR) directly measures range and velocity of an object by transmitting a frequency modulated light beam and detecting a return signal. The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment.

BRIEF SUMMARY OF THE INVENTION

Implementations of the disclosure include a light detection and ranging (LIDAR) sensor system including a plurality of LIDAR pixels and a local oscillator module. The local oscillator module is coupled to the plurality of LIDAR pixels. The local oscillator module includes a first local oscillator input configured to receive a first local oscillator signal and a second local oscillator input configured to receive a second local oscillator signal. The local oscillator module is configured to provide the first local oscillator signal and the second local oscillator signal to a first LIDAR pixel of the plurality of LIDAR pixels.

In an implementation, the LIDAR sensor system includes one or more processors and a transmit beam module. The transmit beam module is configured to receive a transmit beam. The one or more processors are configured to (i) drive the transmit beam module to provide the transmit beam to the first LIDAR pixel and (ii) drive the local oscillator module to provide the first local oscillator signal and the second local oscillator signal to the first LIDAR pixel.

In an implementation, the one or more processors are further configured to: drive the local oscillator module to provide the first local oscillator signal and the second local oscillator signal to a second LIDAR pixel of the plurality of LIDAR pixels; and drive the transmit beam module to provide the transmit beam to the second LIDAR pixel while the one or more processors drive the local oscillator module to provide the first local oscillator signal and the second local oscillator signal to the second LIDAR pixel.

In an implementation, the transmit beam module is configured to provide the transmit beam to a particular LIDAR pixel in the plurality of LIDAR pixels.

In an implementation, the one or more processors are configured to drive the transmit beam module to provide the transmit beam to the first LIDAR pixel while the one or more processors drive the local oscillator module to provide the first local oscillator signal and the second local oscillator signal to the first LIDAR pixel.

In an implementation, at least the first LIDAR pixel and a second LIDAR pixel in the plurality of LIDAR pixels include: (1) a transmit optical antenna to emit a transmit beam; (2) a receive optical antenna to detect a return beam; (3) a first receiver configured to receive (i) a first polarization orientation of the return beam; and (ii) the first local oscillator signal from local oscillator module; and (4) a second receiver configured to receive (i) a second polarization orientation of the return beam; and (ii) the second local oscillator signal from the local oscillator module.

In an implementation, the receive optical antenna includes: a first polarization receive grating configured to direct the first polarization orientation of the return beam to the first receiver; and a second polarization receive grating configured to direct the second polarization orientation of the return beam to the second receiver. The first polarization receive grating is spaced apart from the second polarization receive grating.

In an implementation, the first receiver includes a first optical mixer and the second receiver includes a second optical mixer.

In an implementation, the local oscillator module is configured to provide the first local oscillator signal and the second local oscillator signal to only one particular LIDAR pixel in the plurality of LIDAR pixels, at any given time.

In an implementation, LIDAR sensor system further includes a light source configured to emit near-infrared light and a splitter configured to split the near-infrared light into a transmit signal and a local oscillator signal. At least one of the first local oscillator signal and the second local oscillator signal is derived from the local oscillator signal.

In an implementation, the local oscillator module includes at least two optical switches.

In an implementation, the first local oscillator signal has a first polarization orientation and the second local oscillator signal has a second polarization orientation that is different from the first polarization orientation.

In an implementation, the first polarization orientation is orthogonal to the second polarization orientation.

Implementations of the disclosure include an autonomous vehicle control system for an autonomous vehicle including a light detection and ranging (LIDAR) device and one or more processors. The one or more processors are configured to control the autonomous vehicle in response to the beat signals. The LIDAR device includes a plurality of LIDAR pixels configured to generate beat signals and a local oscillator module. The local oscillator module is coupled to the plurality of LIDAR pixels. The local oscillator module includes a first local oscillator input configured to receive a first local oscillator signal and a second local oscillator input configured to receive a second local oscillator signal. The local oscillator module is configured to provide the first local oscillator signal and the second local oscillator signal to a first LIDAR pixel of the plurality of LIDAR pixels.

In an implementation, the autonomous vehicle control system further includes a transmit beam module configured to receive a transmit beam. The one or more processors are configured to drive (i) the transmit beam module to provide the transmit beam to the first LIDAR pixel and (ii) the local oscillator module to provide the first local oscillator signal and the second local oscillator signal to the first LIDAR pixel.

In an implementation, the one or more processors are further configured to: drive the local oscillator module to provide the first local oscillator signal and the second local oscillator signal to a second first LIDAR pixel of the plurality of LIDAR pixels; and drive the transmit beam module to provide the transmit beam to the second first LIDAR pixel while the one or more processors drive the local oscillator module to provide the first local oscillator signal and the second local oscillator signal to the second first LIDAR pixel.

In an implementation, the transmit beam module is configured to provide the transmit beam to a particular LIDAR pixel in the plurality of LIDAR pixels.

In an implementation, the one or more processors are configured to drive the transmit beam module to provide the transmit beam to the first LIDAR pixel while the one or more processors drive the local oscillator module to provide the first local oscillator signal and the second local oscillator signal to the first LIDAR pixel.

Implementations of the disclosure include an autonomous vehicle including a light detection and ranging (LIDAR) device and one or more processors configured to control the autonomous vehicle in response to the beat signals. The LIDAR device includes a plurality of LIDAR pixels configured to generate beat signals and a local oscillator module coupled to the plurality of LIDAR pixels. The local oscillator module is coupled to the plurality of LIDAR pixels. The local oscillator module includes a first local oscillator input to receive a first local oscillator signal and a second local oscillator input to receive a second local oscillator signal. The local oscillator module is configured to selectively provide the first local oscillator signal and the second local oscillator signal to a first LIDAR pixel of the plurality of LIDAR pixels.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 1C illustrates a block diagram of an example of a system environment for autonomous commercial trucking vehicles, in accordance with implementations of the disclosure.

DETAILED DESCRIPTION

Figure 1A:
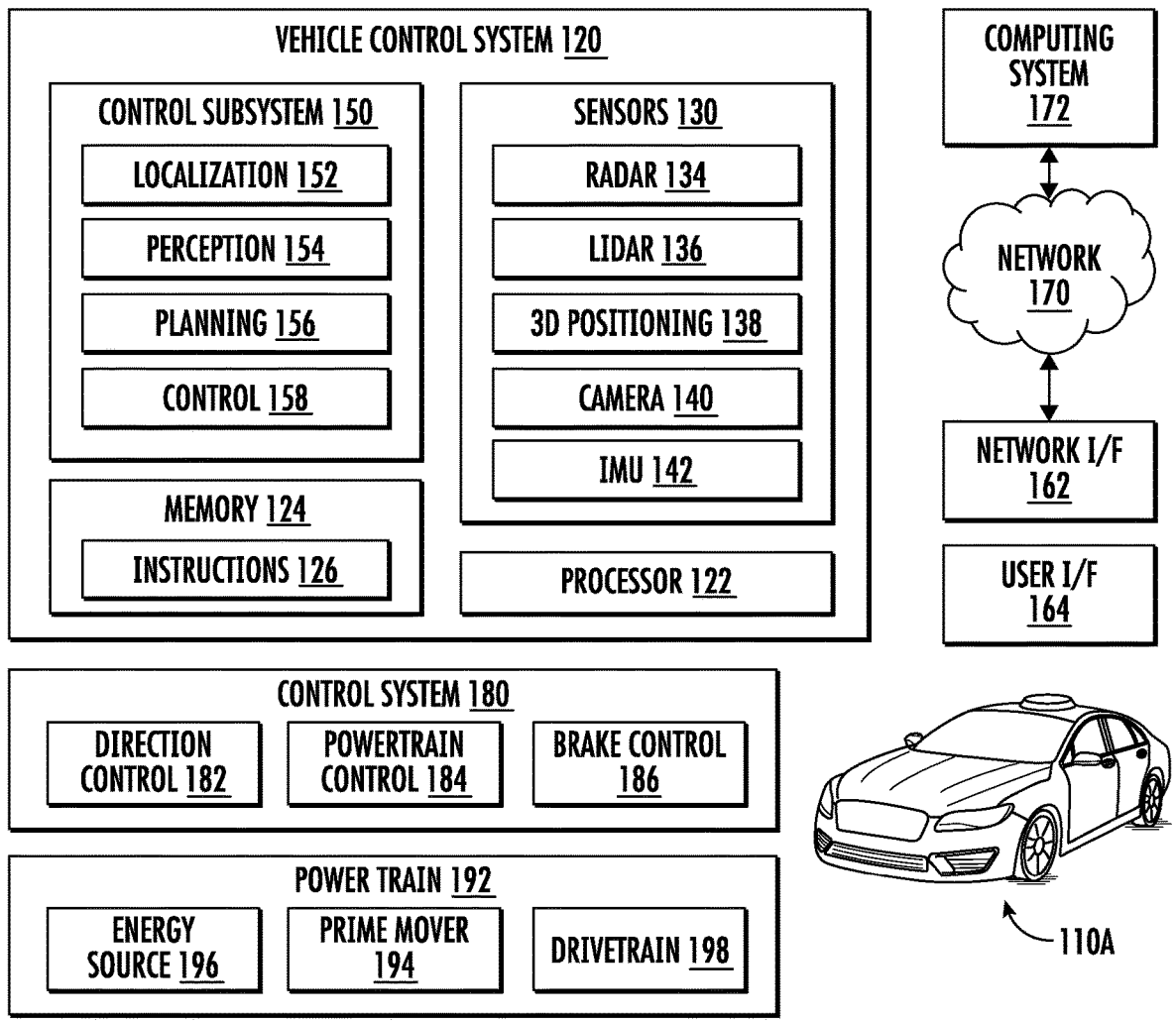
FIG. 1A illustrates a block diagram of an example of a system environment for autonomous vehicles, in accordance with implementations of the disclosure.

Implementations of light detection and ranging (LIDAR) with switchable local oscillator signals are described herein. In the following description, numerous specific details are set forth to provide a thorough understanding of the implementations. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1600 nm.

Frequency Modulated Continuous Wave (FMCW) LIDAR directly measures range and velocity of an object/target by transmitting a frequency modulated light beam to an object or target. The light that is reflected from the object/target may be combined with a tapped version of the light beam. The frequency of the resulting beat signal is proportional to the distance of the object from the LIDAR system once corrected for the doppler shift that requires a second measurement. The two measurements, which may or may not be performed at the same time, provide both range and velocity information.

Implementations of the disclosure include a LIDAR system and device that uses switchable local oscillator signals. A LIDAR device may include a plurality of LIDAR pixels. The LIDAR pixels may have a transmit optical antenna for emitting a transmit beam and at least one receive optical antenna for detecting a return beam that is the transmit beam reflecting off of a target in an environment. The LIDAR pixels may have a plurality of optical receivers that receive different local oscillator signals. For instance, a first optical receiver of the LIDAR pixel may receive a first oscillator signal having a first polarization orientation and a second optical receiver of the LIDAR pixel may receive a second local oscillator signal having a second polarization orientation that is different from the first polarization orientation. The first optical receiver may receive a first polarization orientation of the return signal and the second optical receiver may receive a second polarization orientation of the return signal. Previously, a first local oscillator signal and second local oscillator signal may have been provided to each of the LIDAR pixels concurrently. However, this techniques can be a drain on optical power and is also optically noisy, which may translate into weaker signal-to-noise ratio (SNR) for detecting the return beam.

In implementation of the disclosure, a local oscillator module is configured to receive a first local oscillator signal and a second local oscillator signal. The local oscillator module is configured to selectively provide the first local oscillator signal and the second local oscillator signal to a beam-emitting LIDAR pixel that is in a plurality of LIDAR pixels. A transmit beam (e.g. infrared laser light) may be provided to the beam-emitting LIDAR pixel at the same time that the first local oscillator signal and the second local oscillator signal is provided to the beam-emitting LIDAR pixel. A transmit beam module may be configured to provide the transmit beam to whichever LIDAR pixel in the plurality is the beam-emitting LIDAR pixel. In this way, the transmit beam and the first local oscillator signal and the second local oscillator signal may be selectively provided (in some implementations simultaneously) to one LIDAR pixel at a time in order to scan through a plurality of LIDAR pixels. The beam-emitting LIDAR pixel is the LIDAR pixel, at a given time, that would receive the transmit beam, the first local oscillator signal, and the second local oscillator signal.

Each LIDAR pixel in the plurality of LIDAR pixels may include a transmit optical antenna, a receive optical antenna, a first receiver, and a second receiver. The transmit optical antenna is configured to emit a transmit beam. The receive optical antenna is configured to detect a return beam. The first receiver may be configured to receive a first polarization orientation of the return beam and the first local oscillator signal from local oscillator module. The second receiver may be configured to receive a second polarization orientation of the return beam and the second local oscillator signal from local oscillator module. The first local oscillator signal may have a polarization orientation that is orthogonal to the second local oscillator signal. The first receiver and the second receiver may generate a first beat signal and a second beat signal. These beat signals may be utilized to generate a LIDAR image of an environment. These and other implementations are described in more detail in connection with FIGS. 1-8.

1. System Environment for Autonomous Vehicles

FIG. 1A is a block diagram illustrating an example of a system environment for autonomous vehicles according to some implementations.

Referring to FIG. 1A, an example autonomous vehicle 110A within which the various techniques disclosed herein may be implemented. The vehicle 110A, for example, may include a powertrain 192 including a prime mover 194 powered by an energy source 196 and capable of providing power to a drivetrain 198, as well as a control system 180 including a direction control 182, a powertrain control 184, and a brake control 186. The vehicle 110A may be implemented as any number of different types of vehicles, including vehicles capable of transporting people and/or cargo, and capable of traveling in various environments, and it will be appreciated that the aforementioned components 180-198 can vary widely based upon the type of vehicle within which these components are utilized.

For simplicity, the implementations discussed hereinafter will focus on a wheeled land vehicle such as a car, van, truck, bus, etc. In such implementations, the prime mover 194 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 198 can include wheels and/or tires along with a transmission and/or any other mechanical drive components to convert the output of the prime mover 194 into vehicular motion, as well as one or more brakes configured to controllably stop or slow the vehicle 110A and direction or steering components suitable for controlling the trajectory of the vehicle 110A (e.g., a rack and pinion steering linkage enabling one or more wheels of the vehicle 110A to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 182 may include one or more actuators and/or sensors for controlling and receiving feedback from the direction or steering components to enable the vehicle 110A to follow a desired trajectory. The powertrain control 184 may be configured to control the output of the powertrain 192, e.g., to control the output power of the prime mover 194, to control a gear of a transmission in the drivetrain 198, etc., thereby controlling a speed and/or direction of the vehicle 110A. The brake control 186 may be configured to control one or more brakes that slow or stop vehicle 110A, e.g., disk or drum brakes coupled to the wheels of the vehicle.

Other vehicle types, including but not limited to off-road vehicles, all-terrain or tracked vehicles, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

Various levels of autonomous control over the vehicle 110A can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals.

Sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 110A. Each sensor 130 can output sensor data at various data rates, which may be different than the data rates of other sensors 130.

The outputs of sensors 130 may be provided to a set of control subsystems 150, including, a localization subsystem 152, a planning subsystem 156, a perception subsystem 154, and a control subsystem 158. The localization subsystem 152 can perform functions such as precisely determining the location and orientation (also sometimes referred to as "pose") of the vehicle 110A within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 110A. A machine learning model can be utilized in tracking objects. The planning subsystem 156 can perform functions such as planning a trajectory for vehicle 110A over some timeframe given a desired destination as well as the static and moving objects within the environment. A machine learning can be utilized in planning a vehicle trajectory. The control subsystem 158 can perform functions such as generating suitable control signals for controlling the various controls in the vehicle control system 120 in order to implement the planned trajectory of the vehicle 110A. A machine learning model can be utilized to generate one or more signals to control an autonomous vehicle to implement the planned trajectory.

It will be appreciated that the collection of components illustrated in FIG. 1A for the vehicle control system 120 is merely exemplary in nature. Individual sensors may be omitted in some implementations. Additionally or alternatively, in some implementations, multiple sensors of types illustrated in FIG. 1A may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 110A may also include a secondary vehicle control system (not illustrated), which may be used as a redundant or backup control system for the vehicle 110A. The secondary vehicle control system may be capable of fully operating the autonomous vehicle 110A in the event of an adverse event in the vehicle control system 120, while in other implementations, the secondary vehicle control system may only have limited functionality, e.g., to perform a controlled stop of the vehicle 110A in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 110A, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 110A outside of the purposes of autonomous control, e.g., to control entertainment systems, to operate doors, lights, convenience features, etc.

In addition, for additional storage, the vehicle 110A may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 110A may include a user interface 164 to enable vehicle 110A to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 110A may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 110A receives environmental and other data for use in autonomous control thereof. Data collected by the one or more sensors 130 can be uploaded to a computing system 172 via the network 170 for additional processing. A time stamp can be added to each instance of vehicle data prior to uploading.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 110A via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 1A is not intended to limit implementations disclosed herein. Indeed, other alternative hardware and/or software environments may be used without departing from the scope of implementations disclosed herein.

2. FM LIDAR for Automotive Applications

Figure 2:
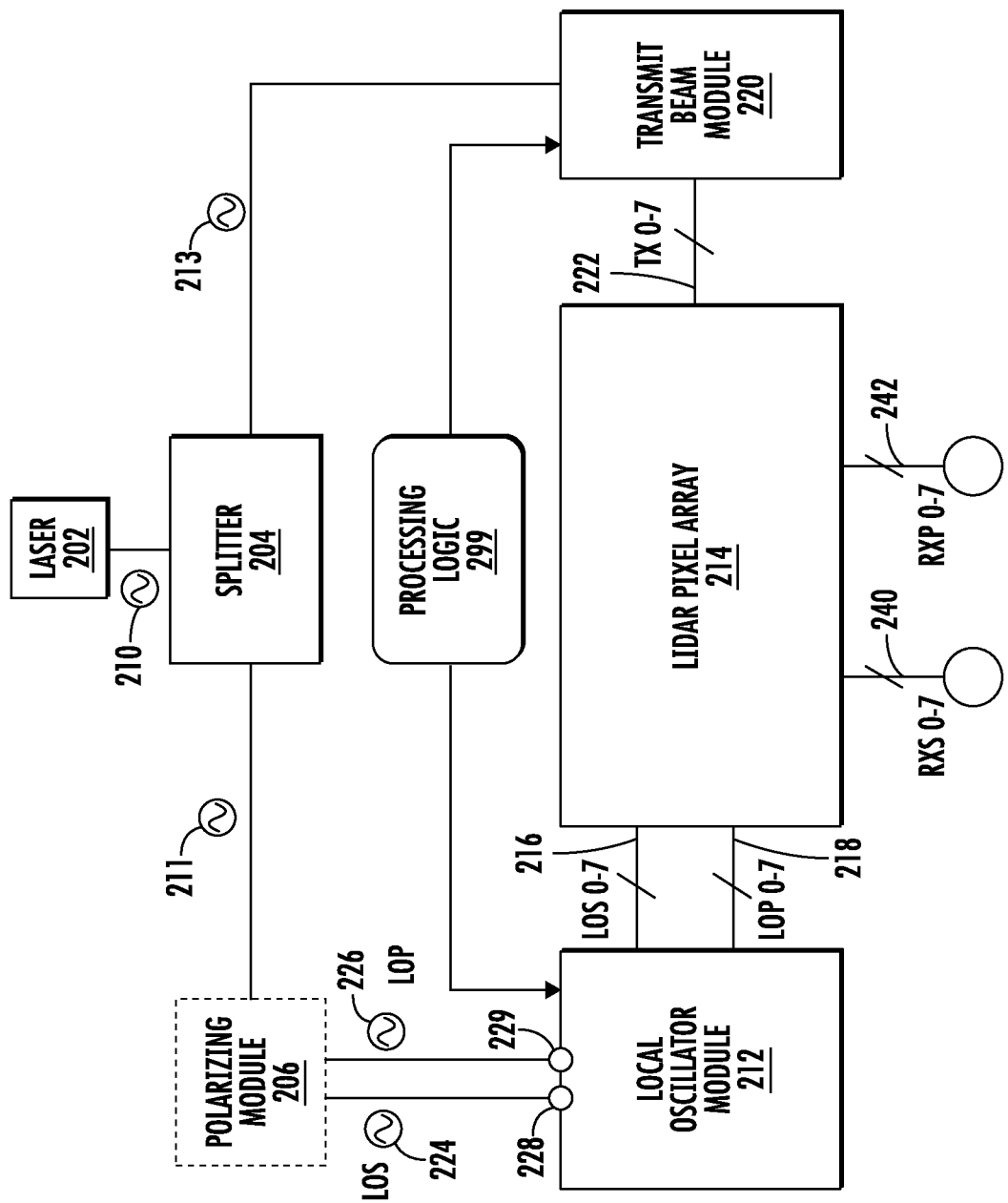
FIG. 2 illustrates a LIDAR system including a local oscillator module, in accordance with implementations of the disclosure.

A truck can include a LIDAR system (e.g., vehicle control system 120 in FIG. 1A, LIDAR system 200 in FIG. 2, etc.). In some implementations, the LIDAR system can use frequency modulation to encode an optical signal and scatter the encoded optical signal into free-space using optics. By detecting the frequency differences between the encoded optical signal and a returned signal reflected back from an object, the frequency modulated (FM) LIDAR system can determine the location of the object and/or precisely measure the velocity of the object using the Doppler effect. An FM LIDAR system may use a continuous wave (referred to as, "FMCW LIDAR" or "coherent FMCW LIDAR") or a quasi-continuous wave (referred to as, "FMQW LIDAR"). The LIDAR system can use phase modulation (PM) to encode an optical signal and scatters the encoded optical signal into free-space using optics.

An FM or phase-modulated (PM) LIDAR system may provide substantial advantages over conventional LIDAR systems with respect to automotive and/or commercial trucking applications. To begin, in some instances, an object (e.g., a pedestrian wearing dark clothing) may have a low reflectivity, in that it only reflects back to the sensors (e.g., sensors 130 in FIG. 1A) of the FM or PM LIDAR system a low amount (e.g., 10% or less) of the light that hit the object. In other instances, an object (e.g., a shiny road sign) may have a high reflectivity (e.g., above 10%), in that it reflects back to the sensors of the FM LIDAR system a high amount of the light that hit the object.

Regardless of the object's reflectivity, an FM LIDAR system may be able to detect (e.g., classify, recognize, discover, etc.) the object at greater distances (e.g., 2×) than a conventional LIDAR system. For example, an FM LIDAR system may detect a low reflectivity object beyond 300 meters, and a high reflectivity object beyond 400 meters.

To achieve such improvements in detection capability, the FM LIDAR system may use sensors (e.g., sensors 130 in FIG. 1A). In some implementations, these sensors can be single photon sensitive, meaning that they can detect the smallest amount of light possible. While an FM LIDAR system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR system in infrared wavelengths, the FM or PM LIDAR system can broadcast stronger light pulses or light beams while meeting eye safety standards. Conventional LIDAR systems are often not single photon sensitive and/or only operate in near infrared wavelengths, requiring them to limit their light output (and distance detection capability) for eye safety reasons.

Thus, by detecting an object at greater distances, an FM LIDAR system may have more time to react to unexpected obstacles. Indeed, even a few milliseconds of extra time could improve safety and comfort, especially with heavy vehicles (e.g., commercial trucking vehicles) that are driving at highway speeds.

Another advantage of an FM LIDAR system is that it provides accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR system to determine distant or sparse data points as objects and/or track how those objects are moving over time. For example, an FM LIDAR sensor (e.g., sensors 130 in FIG. 1A) may only receive a few returns (e.g., hits)

on an object that is 300 m away, but if those return give a velocity value of interest (e.g., moving towards the vehicle at >70 mph), then the FM LIDAR system and/or the autonomous vehicle control system may determine respective weights to probabilities associated with the objects.

Faster identification and/or tracking of the FM LIDAR system gives an autonomous vehicle control system more time to maneuver a vehicle. A better understanding of how fast objects are moving also allows the autonomous vehicle control system to plan a better reaction.

Another advantage of an FM LIDAR system is that it has less static compared to conventional LIDAR systems. That is, the conventional LIDAR systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR systems often need extra hardware, complex software, and/or more computational power to manage this "noise."

In contrast, FM LIDAR systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR systems produce (e.g., generates, derives, etc.) more accurate data with less hardware or software requirements, enabling safer and smoother driving.

Lastly, an FM LIDAR system is easier to scale than conventional LIDAR systems. As more self-driving vehicles (e.g., cars, commercial trucks, etc.) show up on the road, those powered by an FM LIDAR system likely will not have to contend with interference issues from sensor crosstalk. Furthermore, an FM LIDAR system uses less optical peak power than conventional LIDAR sensors. As such, some or all of the optical components for an FM LIDAR can be produced on a single chip, which produces its own benefits, as discussed herein.

3. Commercial Trucking

Figure 1B:
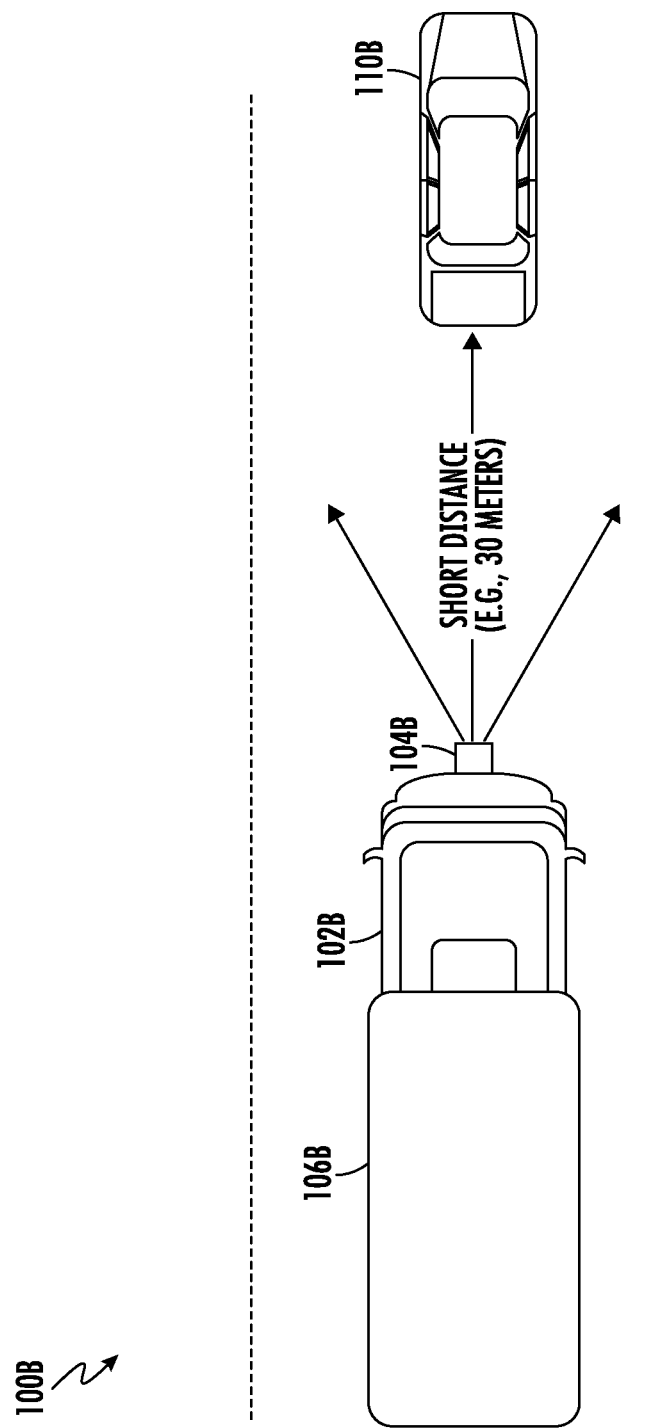
FIG. 1B illustrates a block diagram of an example of a system environment for autonomous commercial trucking vehicles, in accordance with implementations of the disclosure.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. The commercial truck 102B may be a flatbed truck, a refrigerated truck (e.g., a reefer truck), a vented van (e.g., dry van), a moving truck, etc. The cargo 106B may be goods and/or produce. The commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a LIDAR system 104B (e.g., an FM LIDAR system, vehicle control system 120 in FIG. 1A, etc.) for determining a distance to the object 110B and/or measuring the velocity of the object 110B. Although FIG. 1B shows that one LIDAR system 104B is mounted on the front of the commercial truck 102B, the number of LIDAR system and the mounting area of the LIDAR system on the commercial truck are not limited to a particular number or a particular area. The commercial truck 102B may include any number of LIDAR systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR system 104B in environment 100B may be configured to detect an object (e.g., another vehicle, a bicycle, a tree, street signs, potholes, etc.) at short distances (e.g., 30 meters or less) from the commercial truck 102B.

FIG. 1C is a block diagram illustrating an example of a system environment for autonomous commercial trucking vehicles, according to some implementations. The environment 100C includes the same components (e.g., commercial truck 102B, cargo 106B, LIDAR system 104B, etc.) that are included in environment 100B.

Figure 1D:
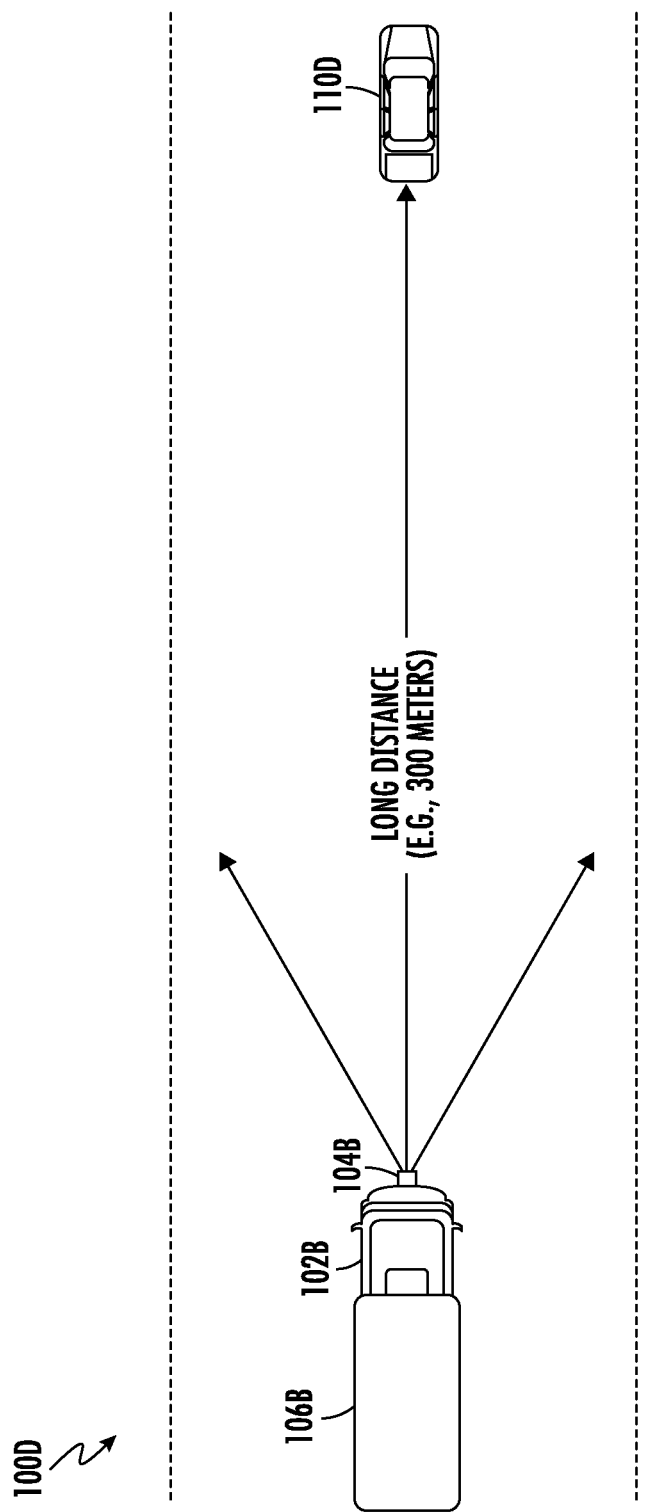
FIG. 1D illustrates a block diagram of an example of a system environment for autonomous commercial trucking vehicles, in accordance with implementations of the disclosure.

The environment 100C includes an object 110C (shown in FIG. 1C as another vehicle) that is within a distance range that is (i) more than 30 meters and (ii) equal to or less than 150 meters from the commercial truck 102B. As shown, the LIDAR system 104B in environment 100C may be configured to detect an object (e.g., another vehicle, a bicycle, a tree, street signs, potholes, etc.) at a distance (e.g., 100 meters) from the commercial truck 102B FIG. 1D is a block diagram illustrating an example of a system environment for autonomous commercial trucking vehicles, according to some implementations. The environment 100D includes the same components (e.g., commercial truck 102B, cargo 106B, LIDAR system 104B, etc.) that are included in environment 100B.

The environment 100D includes an object 110D (shown in FIG. 1D as another vehicle) that is within a distance range that is more than 150 meters from the commercial truck 102B. As shown, the LIDAR system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR systems (e.g., FMCW and/or FMQW systems) or PM LIDAR systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM LIDAR systems can be used in semi-autonomous applications, in which the commercial truck has a driver and some functions of the commercial truck are autonomously operated using the FM or PM LIDAR system, or fully autonomous applications, in which the commercial truck is operated entirely by the FM or LIDAR system, alone or in combination with other vehicle systems.

4. Continuous Wave Modulation and Quasi-Continuous Wave Modulation

In a LIDAR system that uses CW modulation, the modulator modulates the laser light continuously. For example, if a modulation cycle is 10 seconds, an input signal is modulated throughout the whole 10 seconds. Instead, in a LIDAR system that uses quasi-CW modulation, the modulator modulates the laser light to have both an active portion and an inactive portion. For example, for a 10 second cycle, the modulator modulates the laser light only for 8 seconds (sometimes referred to as, "the active portion"), but does not modulate the laser light for 2 seconds (sometimes referred to as, "the inactive portion"). By doing this, the LIDAR system may be able to reduce power consumption for the 2 seconds because the modulator does not have to provide a continuous signal.

In Frequency Modulated Continuous Wave (FMCW) LIDAR for automotive applications, it may be beneficial to operate the LIDAR system using quasi-CW modulation where FMCW measurement and signal processing methodologies are used, but the light signal is not in the on-state (e.g., enabled, powered, transmitting, etc.) all the time. In some implementations, Quasi-CW modulation can have a duty cycle that is equal to or greater than 1% and up to 50%. If the energy in the off-state (e.g., disabled, powered-down, etc.) can be expended during the actual measurement time then there may be a boost to signal-to-noise ratio (SNR) and/or a reduction in signal processing requirements to coherently integrate all the energy in the longer time scale.

FIG. 2 illustrates a LIDAR system 200 including a local oscillator module 212, in accordance with implementations of the disclosure. LIDAR system 200 may be an example implementation of LIDAR system 104B (shown in FIG. 1B). LIDAR system 200 includes a laser 202, a splitter 204, a polarizing module 206, local oscillator module 212, a transmit beam module 220, a LIDAR pixel array 214, and processing logic 299, in the illustrated implementation of FIG. 2. Splitter 204 may be coupled to laser 202 to receive a transmit signal 210. Splitter 204 may split transmit signal 210 into transmit beam 213 and local oscillator signal 211. Optionally, a polarizing module such as polarizing module 206 may receive local oscillator signal 211 and generate first local oscillator signal 224 and a second local oscillator signal 226. First local oscillator signal 224 and a second local oscillator signal 226 may have a different polarization orientations. In the illustrated implementation, first local oscillator signal 224 and second local oscillator signal 226 have orthogonal polarization orientations since first local oscillator signal 224 is illustrated as S-polarized light (LOS) and second local oscillator signal 226 is illustrated as P-polarized light (LOP). In an implementation, first local oscillator signal 224 and a second local oscillator signal 226 have the same polarization orientations. At least one of the first local oscillator signal and the second local oscillator signal may be derived from the local oscillator signal 211.

Local oscillator module 212 is configured to receive first local oscillator signal 224 at a first local oscillator input 228 and second local oscillator signal 226 at a second local oscillator input 229. Local oscillator module 212 is coupled to the plurality of LIDAR pixels in LIDAR pixel array 214. Local oscillator module 212 is configured to selectively provide the first local oscillator signal 224 and the second local oscillator signal 226 to a beam-emitting LIDAR pixel of the plurality of LIDAR pixels.

In an implementation, LIDAR pixel array 214 includes eight LIDAR pixels and, at any given time, one of the LIDAR pixels in the LIDAR pixel array 214 is the beam-emitting LIDAR pixel. The beam-emitting LIDAR pixel may also receive the transmit beam by way of optical bus 222. Processing logic 299 may drive the local oscillator module 212 and the transmit beam module 220 to provide the transmit beam 213, the first local oscillator signal 224, and the second local oscillator signal 226 to the same LIDAR pixel (the beam-emitting LIDAR pixel) in LIDAR pixel array 214. Processing logic 299 may drive the local oscillator module 212 and the transmit beam module 220 to sequentially provide the transmit beam 213, the first local oscillator signal 224, and the second local oscillator signal 226 to different LIDAR pixels in the LIDAR pixel array 214 in order to scan through each LIDAR pixel as the beam-emitting LIDAR pixel. In this way, each LIDAR pixel may emit a transmit beam and detect a return beam as a reflection of the transmit beam reflecting off of a target in the environment. Each LIDAR pixel may generate one or more beat signals by detecting the return beam(s) and the beat signals may be utilized to form a LIDAR image.

Having system 200 provide the transmit beam 213, the first local oscillator signal 224, and the second local oscillator signal 226 to the same LIDAR pixel (instead of providing these signals to all the LIDAR pixels simultaneously) reduces the optical power required to operate LIDAR system 200. Yet another potential advantage is a reduction of optical noise in LIDAR system 200 that may increase the signal-to-noise-ratio (SNR) of the beat signals generated by the LIDAR pixels. The reduction of optical noise from not providing all the optical signals to each LIDAR pixel simultaneously may stem from reduced optical crosstalk between waveguides of adjacent LIDAR pixels, for instance and may help reduce the complexity of electrical signal routing. Advantageously, reducing the complexity of the electrical signal routing may save on the cost of the conductor (e.g. copper), reduce weight, and allow for reduced size of the LIDAR pixel array. In particular, for autonomous vehicles, the reduction of cost allows the LIDAR system to be deployed in more vehicles and the reduction in weight and size allows the LIDAR pixel arrays to be placed in a greater variety of positions on the autonomous vehicle.

FIG. 2 illustrates optical bus 216, optical bus 218, and optical bus 222. Optical bus 216 is coupled between local oscillator module 212 and LIDAR pixel array 214. Optical bus 218 is also coupled between local oscillator module 212 and LIDAR pixel array 214. Optical bus 222 is coupled between transmit beam module 220 and LIDAR pixel array 214. Optical bus 216 (LOS 0-7) may include eight waveguides to provide the first local oscillator signal 224 to the eight LIDAR pixels of LIDAR pixel array 214 and optical bus 218 (LOP 0-7) may include eight waveguides to provide the second local oscillator signal 226 to the eight LIDAR pixels of LIDAR pixel array 214. Similarly, optical bus 222 (TX 0-7) may include eight waveguides to provide the transmit beam 213 to the eight LIDAR pixels of LIDAR pixel array 214. As an example, LIDAR pixel array 214 may include any number of LIDAR pixels such as 4, 16, 32, 48, 64, 96, or 128 LIDAR pixels. As another example, LIDAR pixel array 214 may include 3, 9, 28, or 81 LIDAR pixels. As another example, LIDAR pixel array 214 may include 5, 25, or 125 LIDAR pixels. In these examples, different numbers of LIDAR pixels can be selected to achieve desirable loss ranges.

FIG. 2 also illustrates bus 240 and bus 242. Bus 240 (RXS 0-7) and bus 242 (RXP 0-7) may be electrical busses rather than optical busses. Bus 240 and bus 242 may carry beat signals generated by LIDAR pixels of LIDAR pixel array 214.

Figure 3:
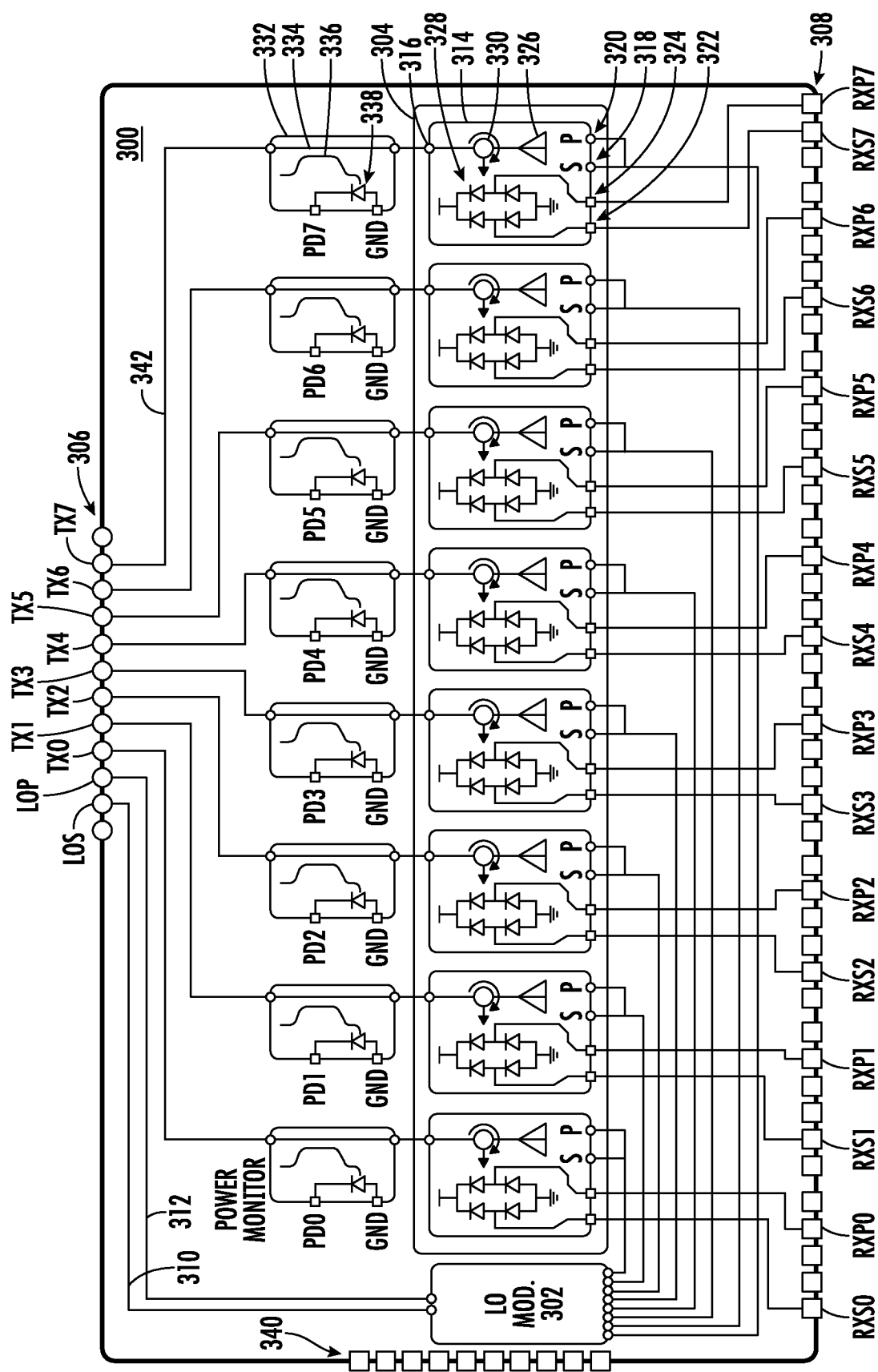
FIG. 3 illustrates an example diagram of a LIDAR transceiver that may include portions of components of the LIDAR system of FIG. 2, in accordance with implementations of the disclosure.

FIG. 3 illustrates an example diagram of a LIDAR transceiver 300 that may include portions of components of LIDAR system 200, in accordance with implementations of the disclosure. LIDAR transceiver 300 includes a local oscillator module 302 that is coupled to provide local oscillator signals to a LIDAR pixel array 304, according to an implementation of the disclosure. Local oscillator module 302 may be configured the same or similarly to local oscillator module 212.

Local oscillator (LO) module 302 may be coupled to one or more of a number of input ports 306 through waveguides 310 and 312 to receive one or both local oscillator signals LOS and LOP. Local oscillator module 302 may be configured to provide local oscillator signals LOS and LOP to one or more LIDAR pixels of LIDAR pixel array 304, to enable the LIDAR pixels to generate receive signals RXS0-7 and RXP0-7 and provide the signals to a number of output ports 308, in accordance with implementations of the disclosure.

LIDAR pixel array 304 may include a number of LIDAR pixels positioned along one or two dimensions of the footprint of LIDAR transceiver 300. LIDAR pixel array 304 may be configured the same or similarly to LIDAR pixel array 214. A LIDAR pixel 314 is an example of one or more of the LIDAR pixels of LIDAR pixel array 304, according to an implementation. LIDAR pixel 314 may receive a transmit beam on a port 316, may receive a first local oscillator signal LOS on a port 318, and may receive a second local oscillator signal LOP on a port 320, according to an implementation. Transmit beam module 220 (not illustrated in FIG. 3) may selectively provide the transmit beam to port 316 by way of terminal TX7 of LIDAR transceiver 300. LIDAR pixel 314 may be configured to generate a receive signal RXS and/or a receive signal RXP and may provide one or both of receive signal RXS and RXP to port 322 and port 324, respectively, in accordance with implementations of the disclosure.

LIDAR pixel 314 may include one or more optical antennas. FIG. 3 illustrates an optical antenna array 326, receiver circuitry 328, and an optical rotator 330, according to an implementation of the disclosure. Optical antenna array 326 may include at least one transmit optical antenna configured to receive a transmit beam and emit the transmit beam into a LIDAR environment. Optical antenna array 326 may include a receive optical antenna configured to detect the return beam. The receive optical antenna may be configured to detect a first polarization orientation of the return beam and a second polarization orientation of the return beam. The first polarization orientation may be orthogonal to the second polarization orientation. Receiver circuitry 328 may be configured to convert optical signals into the electrical signals, e.g., receive signal RXS and receive signal RXP. Receiver circuitry 328 may include one or more pairs of photodiodes configured to receive light and generate electrical signals in response to the received light. Optical rotator 330 may be positioned between optical antenna array 326 and receiver circuitry 328. Optical rotator 330 may be configured to provide the transmit signal to optical antenna array 326 and may be configured to provide return signals from return optical antennas to receiver circuitry 328 to support generation of receive signals RXS and RXP.

LIDAR transceiver 300 may include an array of power monitors configured to detect a quantity of power in each transmit signal provided to LIDAR pixels of LIDAR pixel array 304. The power monitor array may include one power monitor for each LIDAR pixel of LIDAR pixel array 304. Power monitor 332 may be an example of the power monitors of the power monitor array. Power monitor 332 may include a waveguide 334, a waveguide 336, and a photodiode 338. The transmit beam may propagate through waveguide 334, so waveguide 334 may be positioned in-line with transmit signal waveguides. Waveguide 336 may be positioned near waveguide 334 to receive a portion of the transmit signal. Photodiode 338 may be coupled to waveguide 336 and may be configured to convert a portion of the transmit signal into an electrical signal to support power monitoring operations. Transceiver 300 may include a number of ports 340 that are communicatively coupled to the power monitors of the power monitor array and that are configured to provide power monitor outputs externally to transceiver 300. In some implementations, ports 340 may be used to provide control signals from processing logic (e.g. processing logic 299) to drive local oscillator module 302.

Transceiver 300 receives transmit beams (e.g., TX0, TX1, TX2, TX3, TX4, TX5, TX6, TX7, etc.) on ports 306 that are coupled to LIDAR pixel array 304 through a number of waveguides (e.g., waveguide 342), according to an implementation. Although eight transmit signals (e.g., TX0-7) and 16 receive signals (receive signals RXS0-7 and RXP0-7) are illustrated, more or fewer transmit and receive signals may be implemented in transceiver 300, according to various implementations of the disclosure.

Figure 4:
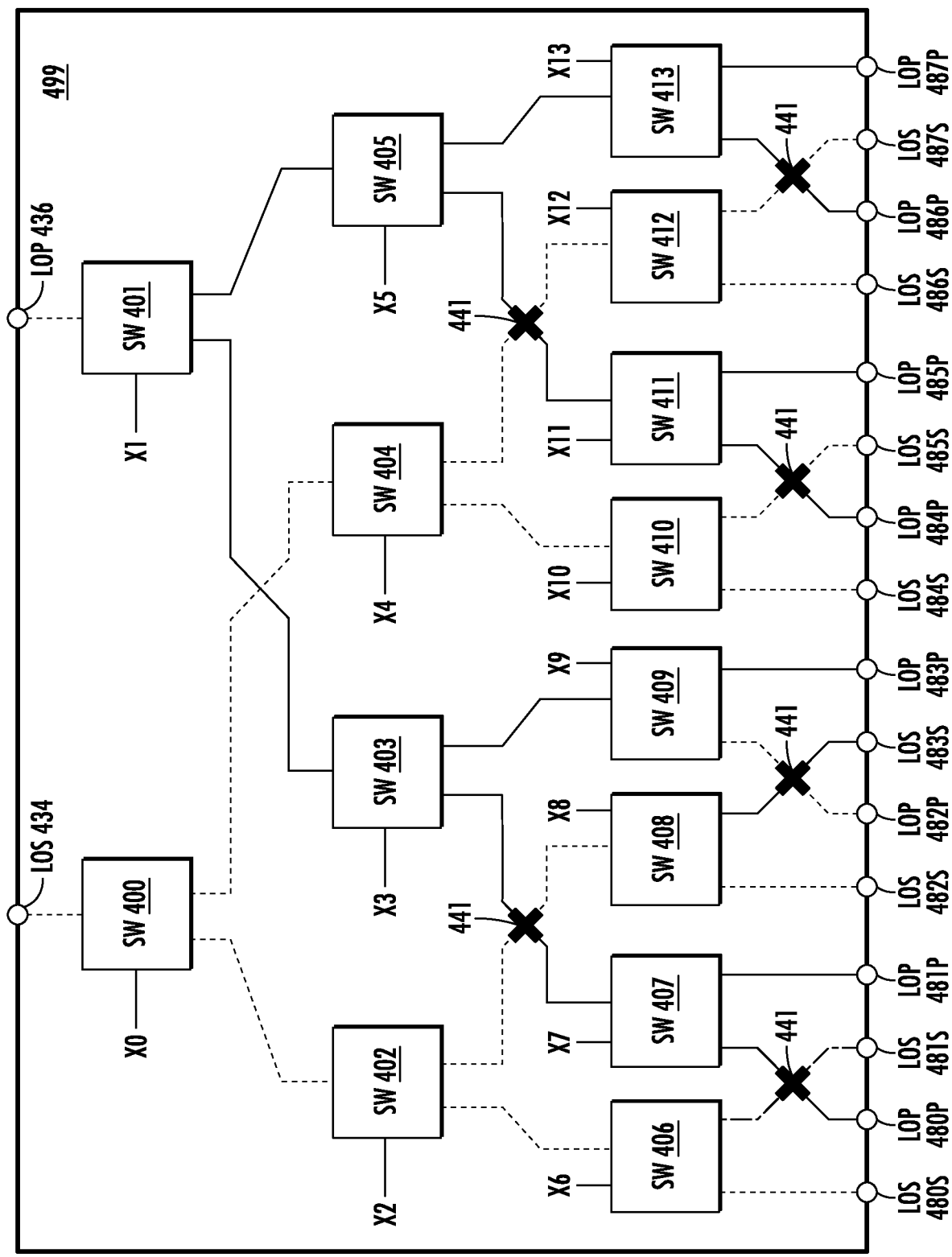
FIG. 4 illustrates an example local oscillator module, in accordance with implementations of the disclosure.

FIG. 4 illustrates an example local oscillator module 499, in accordance with implementations of the disclosure. Local oscillator module 499 may include a plurality of optical switches such as optical switch 400, 401, 402, 403, 404, 405, 406, 407, 408, 409, 410, 411, 412, and 413. Each optical switch is controlled by a corresponding controlling input X0, X1, X2, X3, X4, X5, X6, X7, X8, X9, X10, X11, X12, and X13. The controlling inputs may be coupled to processing logic 299, for example. Processing logic 299 may drive the optical switches by way of their respective controlling inputs to direct the local oscillator signals to particular LIDAR pixels at particular times. In an implementation, processing logic 299 drives the optical switches to direct the local oscillator signals to only one particular LIDAR pixel at a given time. Local oscillator module 499 may be referred to a "2 to 2n" distribution network for its ability to dynamically route two signals to 2n number of ports where n is a numeral. In the implementation of FIG. 4, n is eight and there are 16 (2n) output ports. In an implementation, the local oscillator module may be a "3 to 3n" distribution network for its ability to dynamically route three signals to 3n number of ports where n is a numeral. In another implementation, the local oscillator module may be a "5 to 5n" distribution network for its ability to dynamically route five signals to 5n number of ports where n is a numeral. In these implementations, a particular distribution network can be selected to achieve desirable dynamic routing and optimal signal processing.

In FIG. 4, optical switch 400 is configured to receive first local oscillator signal LOS 434 and optical switch 401 is configured to receive second local oscillator signal LOP 436. In FIG. 4, the dashed lines represent waveguides that provide the first local oscillator signal 434 and the solid lines represent waveguides that provide the second local oscillator signal 436. Components 441 in FIG. 4 represent waveguide crossings, in FIG. 4. In some implementations of local oscillator module 499, multiple waveguide levels are included such that waveguides do not necessarily pass over one another and therefore waveguide crossing components 441 are not necessarily required.

In an implementation, driving a digital high (e.g. 3.3 VDC) onto the controlling input causes the optical switch to direct the input light to exit the left output port and driving a digital low (e.g. 0 VDC) onto the controlling input causes the optical switch to direct the input light to exit the right output port. By way of example, to provide first local oscillator signal 434 and second local oscillator signal 436 to a first LIDAR pixel, controlling inputs X0, X1, X2, X3, X6, and X7 are driven to a digital high so that first local oscillator signal 434 is directed to port LOS 480S and second local oscillator signal 436 is directed to port LOP 480P. To provide first local oscillator signal 434 and second local oscillator signal 436 to a second LIDAR pixel, input ports X0, X1, X2, and X3, may be driven to a digital high and input ports X6 and X7 may be driven to a digital low so that first local oscillator signal 434 is directed to port LOS 481S and second local oscillator signal 436 is directed to port LOP 481P. In some implementations, the signal on controlling inputs X0, X1, X2, X3, X6, and X7 are analog signals. Processing logic 299 may continue driving the controlling inputs of the optical switches to raster scan through the plurality of LIDAR pixels to provide first local oscillator signal 434 and second local oscillator signal 436 to facilitate generating beat signals for a beam-emitting LIDAR pixel. A third, fourth, fifth, sixth, seventh, and eighth LIDAR pixel may receive first local oscillator signal 434 and second local oscillator signal 436 by driving the controlling ports of the optical switches. For example, a third LIDAR pixel may receive first local oscillator signal 434 and second local oscillator signal 436 by way of ports LOS 482S and LOP 482P; a fourth LIDAR pixel may receive first local oscillator signal 434 and second local oscillator signal 436 by way of ports LOS 483S and LOP 483P; a fifth LIDAR pixel may receive first local oscillator signal 434 and second local oscillator signal 436 by way of ports LOS 484S and LOP 484P; a sixth LIDAR pixel may receive first local oscillator signal 434 and second local oscillator signal 436 by way of ports LOS 485S and LOP 485P; a seventh LIDAR pixel may receive first local oscillator signal 434 and second local oscillator signal 436 by way of ports LOS 486S and LOP 486P; and an eighth LIDAR pixel may receive first local oscillator signal 434 and second local oscillator signal 436 by way of ports LOS 487S and LOP 487P.

Figure 5:
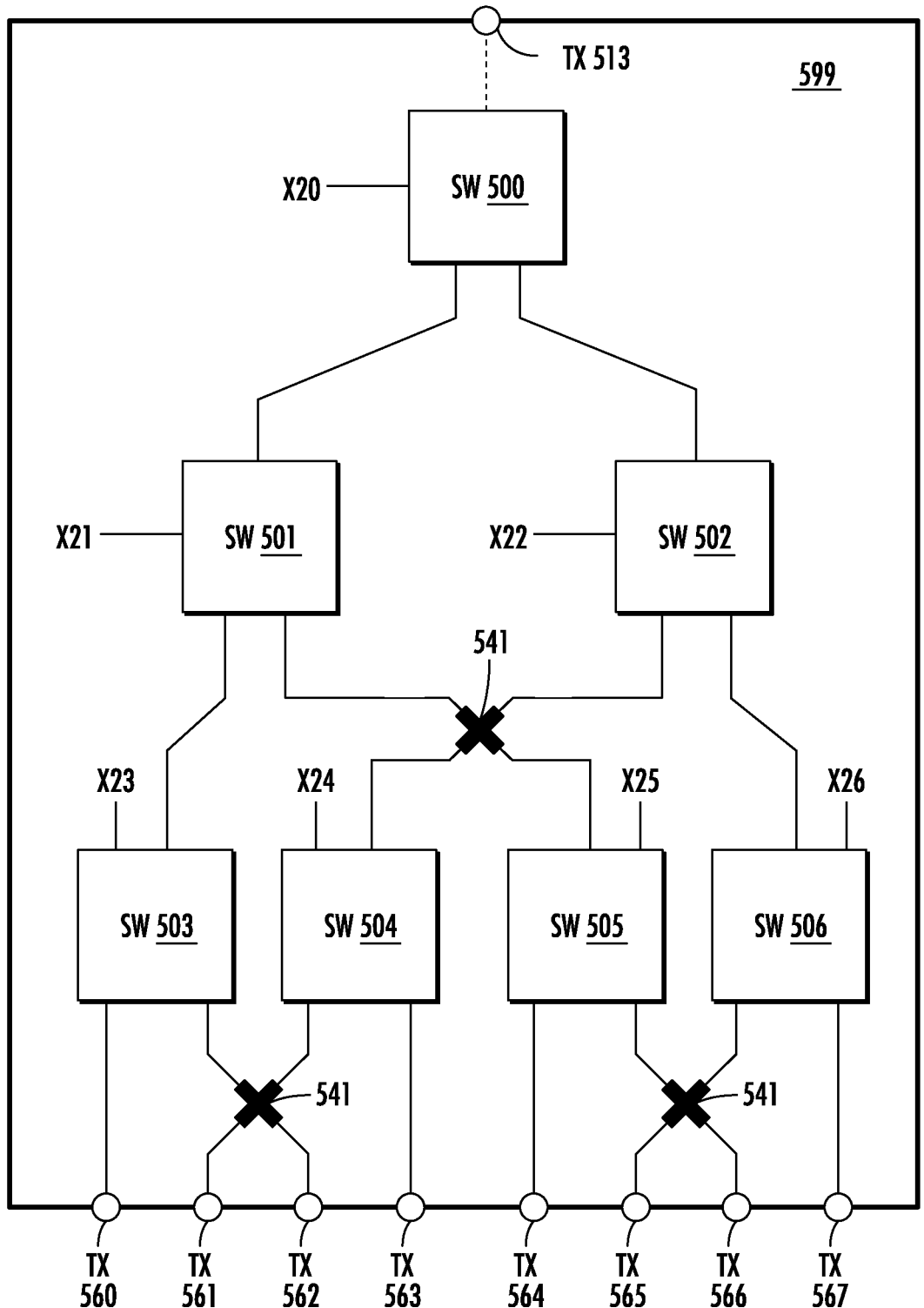
FIG. 5 illustrates an example transmit beam module, in accordance with implementations of the disclosure.

FIG. 5 illustrates an example transmit beam module 599, in accordance with implementations of the disclosure. Transmit beam module 599 may include a plurality of optical switches such as optical switch 500, 501, 502, 503, 504, 505, and 506. Each optical switch is controlled by a corresponding controlling input X20, X21, X22, X23, X24, X25, and X26. The controlling inputs may be coupled to processing logic 299, for example. Processing logic 299 may drive the optical switches by way of their respective controlling inputs to direct the transmit beam to particular LIDAR pixels at particular times. In an implementation, processing logic 299 drives the optical switches to direct the transmit beam to only one particular LIDAR pixel at a given time.

In FIG. 5, optical switch 500 is configured to receive transmit beam 513. Components 541 in FIG. 5 represent waveguide crossings. In an implementation, driving a digital high (e.g. 3.3 VDC) onto the controlling input cause the optical switch to direct the input light to exit the left output port and driving a digital low (e.g. 0 VDC) onto the controlling input causes the optical switch to direct the input light to exit the right output port. By way of example, to provide transmit beam 513 to a first LIDAR pixel, controlling inputs X20, X21, and X23 are driven to a digital high so that transmit beam 513 is direct to port TX 560. To provide transmit beam 513 to a second LIDAR pixel, input ports X22 and X24 may be driven to a digital high and input port X20 may be driven to a digital low so that transmit beam 513 is directed to port TX 561. Processing logic 299 may continue driving the controlling inputs of the optical switches to raster scan through the plurality of LIDAR pixels to provide transmit beam 513 to facilitate generating beat signals for a beam-emitting LIDAR pixel. A third, fourth, fifth, sixth, seventh, and eighth LIDAR pixel may receive the transmit beam 513 by driving the controlling ports of the optical switches to provide transmit beam 513 to ports TX 562, TX 563, TX 564, TX 565, TX 566, and TX 567.

Figure 6:
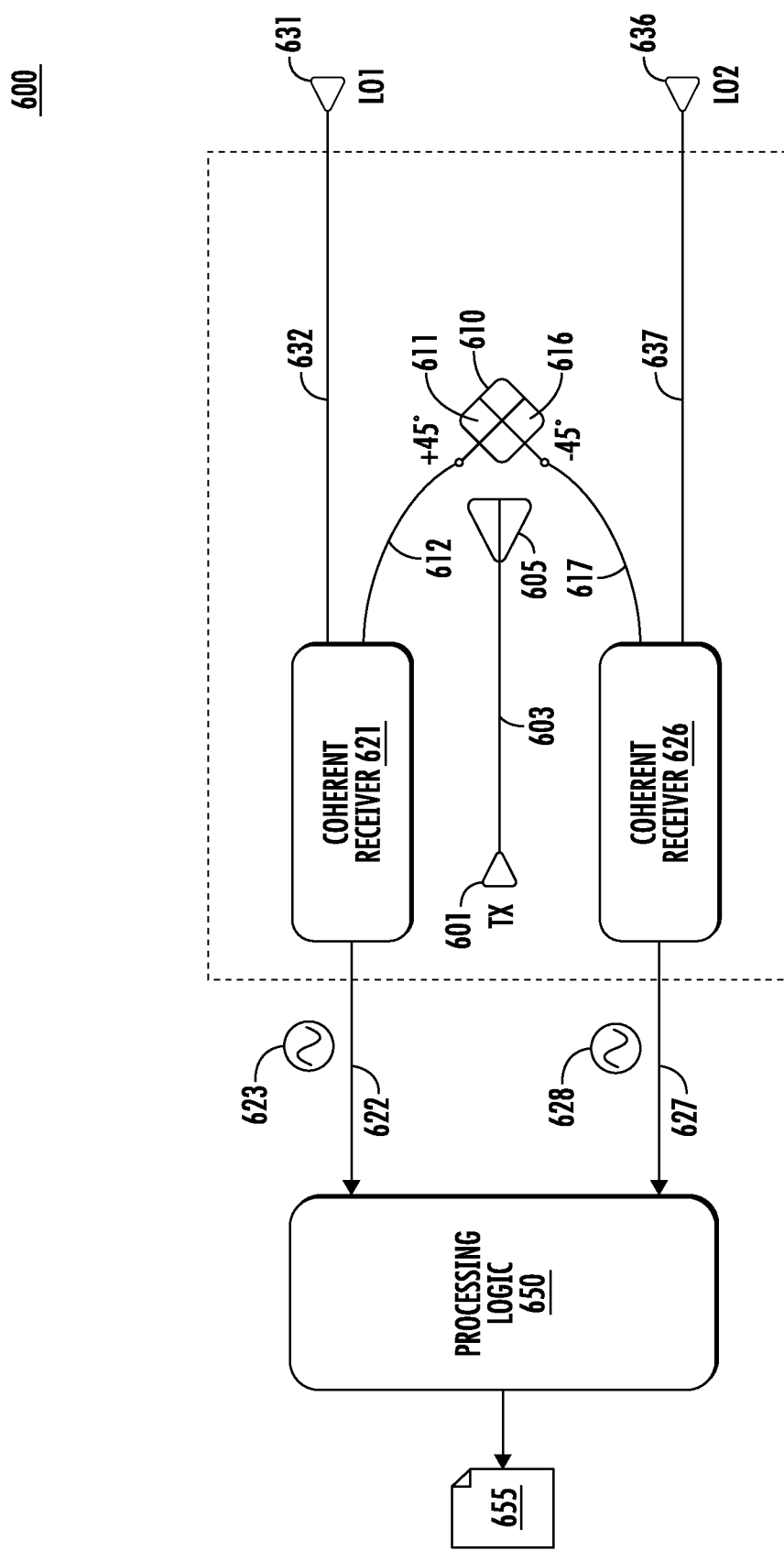
FIG. 6 illustrates an example LIDAR pixel including a first coherent receiver and a second coherent receiver, in accordance with implementations of the disclosure.

FIG. 6 illustrates an example LIDAR pixel 699 including a first coherent receiver 621 and a second coherent receiver 626, in accordance with implementations of the disclosure. LIDAR pixel 699 includes a transmit optical antenna 605, a receive optical antenna 610, a first coherent receiver 621, and a second coherent receiver 626. Transmit optical antenna 605 is configured to emit a transmit beam. The transmit beam may be an infrared transmit beam. The transmit beam may be a near-infrared transmit beam. The transmit beam may be a single defined polarization orientation. In FIG. 6, transmit optical antenna 605 is illustrated as a single-polarization output coupler and may transmit the transmit beam in response to receiving a transmit beam 601 by way of a waveguide 603. The transmit beam 601 may be generated by a laser and the transmit beam emitted by transmit optical antenna 605 may have a very narrow linewidth (e.g. 1 nm or less). Transmit beam 601 may be selectively provided to transmit optical antenna 605 by transmit beam module 220.

Receive optical antenna 610 is a dual polarization receive optical antenna configured to detect a first polarization orientation of a returning beam and a second polarization orientation of the returning beam, in the illustration of FIG. 6. The returning beam is a reflection of the transmit beam reflecting off a target in an external environment of the LIDAR system 600. The first polarization orientation may be orthogonal to the second polarization orientation. The dual polarization receive optical antenna 610 is configured to couple the first polarization orientation of the returning beam to first coherent receiver 621 by way of waveguide 612 and couple the second polarization orientation of the returning beam to second coherent receiver 626 by way of waveguide 617. In an implementation, receive optical antenna 610 includes a first polarization receive grating configured to direct the first polarization orientation of the return beam to the first coherent receiver 621 and a second polarization receive grating configured to direct the second polarization orientation of the return beam to second coherent receiver 626. In an implementation, the first polarization receive grating is spaced apart from the second polarization receive grating.

First coherent receiver 621 is configured to generate a first signal 623 in response to receiving the first polarization orientation of the returning beam and a first local oscillator signal 631. The first local oscillator signal 631 may be an optical signal having the first polarization orientation. First local oscillator signal 631 may be selectively provided by local oscillator module 212, for instance. In FIG. 6, the first polarization orientation of the returning beam is received by first coherent receiver 621 from first single-polarization grating coupler 611 by way of waveguide 612 and the first local oscillator signal 631 is received by first coherent receiver 621 by way of waveguide 632. First signal 623 may be an electrical signal provided to processing logic 650 by way of communication channel 622.

Second coherent receiver 626 is configured to generate a second signal 628 in response to receiving the second polarization orientation of the returning beam and a second local oscillator signal 636. The second local oscillator signal 636 may be an optical signal having the second polarization orientation. Second local oscillator signal 636 may be selectively provided by local oscillator module 212, for instance. In FIG. 6, the second polarization orientation of the returning beam is received by second coherent receiver 626 from second single-polarization grating coupler 616 by way of waveguide 617 and the second local oscillator signal 636 is received by second coherent receiver 626 by way of waveguide 637. Second signal 628 may be an electrical signal provided to processing logic 650 by way of communication channel 627.

Processing logic 650 is configured to generate an image 655 in response to receiving first signal 623 and second signal 628 from first coherent receiver 621 and second coherent receiver 626, respectively. LIDAR system 600 may include an array of LIDAR pixels 699 that are configured to provide first signals (e.g. signal 623) and second signals (e.g. signal 628) to processing logic 650. In this context, processing logic 650 may generate image 655 in response to the first signal and second signals received by processing logic 650 by the plurality of LIDAR pixels 699 in the array of LIDAR pixels.

Figure 7:
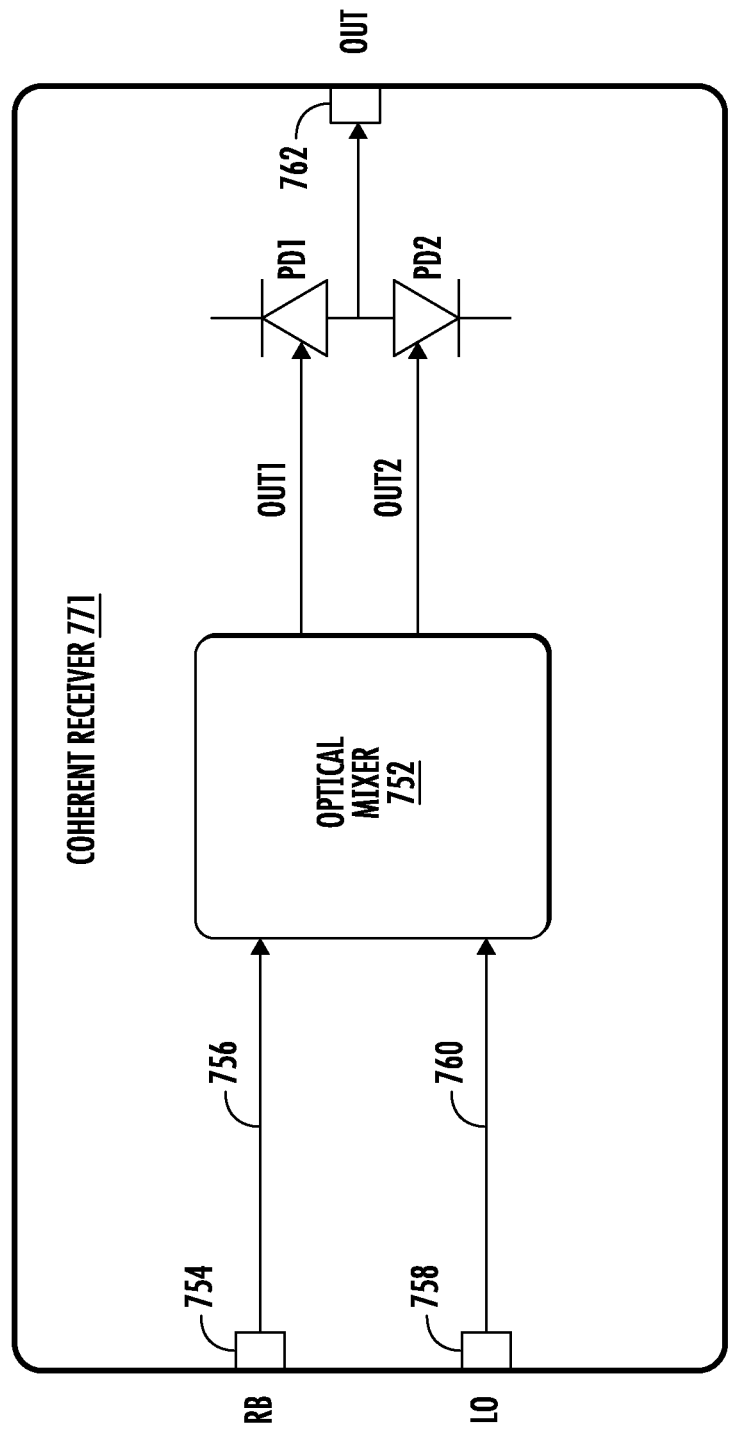
FIG. 7 illustrates an example coherent receiver, in accordance with implementations of the disclosure.

FIG. 7 illustrates an example coherent receiver 771, in accordance with implementations of the disclosure. Example coherent receiver 771 of FIG. 7 may be utilized as first coherent receiver 621 and/or second coherent receiver 626, in some implementations. Coherent receiver 771 includes an optical mixer 752, a return beam port 754, a local oscillator port 758 and an output port 762. Optical mixer 752 is configured to combine a return beam signal (RB) with a local oscillator signal (LO) to generate an output signal (OUT), according to an implementation. Optical mixer 752 may be coupled to receive returning beam signal (RB) from waveguide 612 or waveguide 617, for instance, and waveguide 756 provides the return beam signal to optical mixer 752. Optical mixer 752 may be coupled to receive local oscillator signal LO from waveguide 632 or 637, for instance, and waveguide 760 provides the local oscillator signal LO to optical mixer 752. Optical mixer 752 may combine input signals to generate a number of combined output signals OUT1 and OUT2. Output signals OUT1 and OUT2 are provided to a photodiode pair (including photodiodes PD1 and PD2) to convert returning beam signal RB and local oscillator signal LO into output signal OUT. Output signal OUT may be an electrical signal. Output signal OUT may be a beat signal that represents a range and/or velocity of one or more objects in the environment of a LIDAR system. Communication channel 622 or 627 may be coupled to output port 762, for instance.

Figure 8:
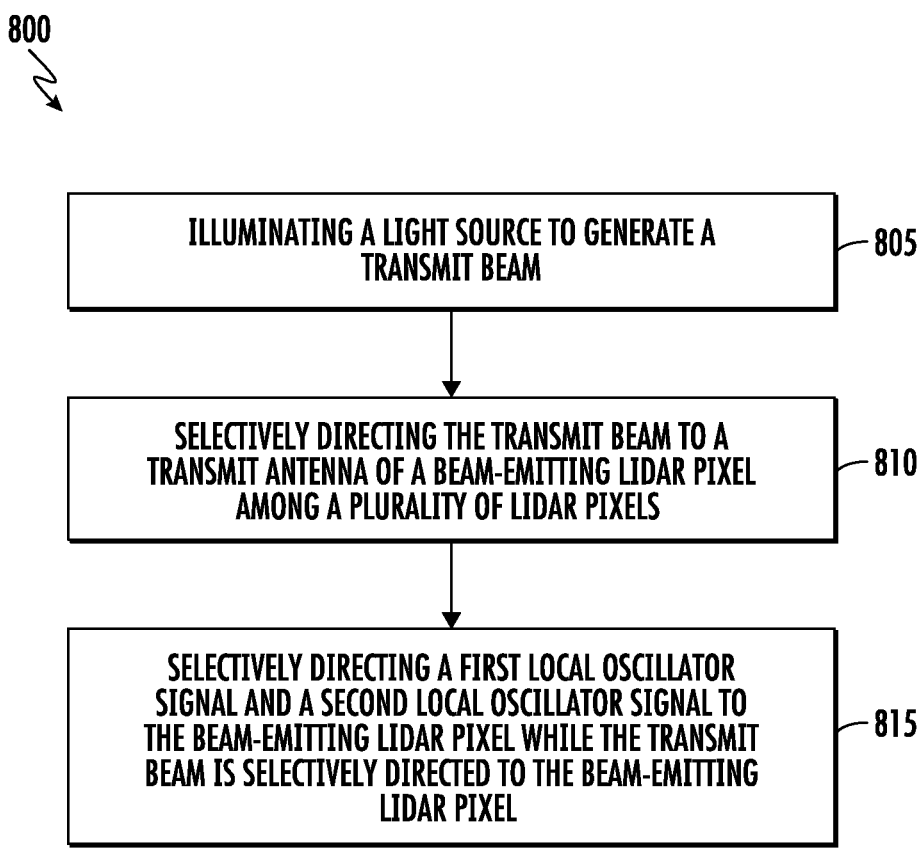
FIG. 8 illustrates a process of operating a LIDAR device, in accordance with implementations of the disclosure.

FIG. 8 illustrates a process 800 of operating a LIDAR device, in accordance with implementations of the disclosure. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel.

In process block 805, a light source (e.g. laser 202) is illuminated to generate a transmit beam. The transmit beam may be near-infrared light.

In process block 810, the transmit beam is selectively directed to a transmit antenna (e.g. antenna 605) of a beam-emitting LIDAR pixel among a plurality of LIDAR pixels.

In process block 815, a first local oscillator signal and a second local oscillator signal are selectively direct to the beam-emitting LIDAR pixel while the transmit beam is selectively directed to the beam-emitting LIDAR pixel.

In an implementation of process 800, the first local oscillator signal is selectively directed to a first optical mixer of the beam-emitting LIDAR pixel and the second local oscillator signal is selectively directed to a second optical mixer of the beam-emitting LIDAR pixel. The first local oscillator signal may be a first polarization orientation and the second local oscillator signal may be a second polarization orientation different from the first polarization orientation.

The beam-emitting LIDAR pixel may include a receive optical antenna to detect a return beam and the first optical mixer may be configured to receive the first polarization orientation of the return beam. The second optical mixer may be configured to receive a second polarization orientation of the return beam.

In an implementation, process 800 further includes (i) selectively directing the transmit beam to a second transmit antenna of a second beam-emitting LIDAR pixel among the plurality of LIDAR pixels and (ii) selectively directing the first local oscillator signal and the second local oscillator signal to the second beam-emitting LIDAR pixel while the transmit beam is selectively directed to the second beam-emitting LIDAR pixel.

In an implementation of process 800, the transmit beam is not directed to the transmit antenna of the beam-emitting LIDAR pixel while the transmit beam is directed to the second transmit antenna of second beam-emitting LIDAR pixel and the first local oscillator signal and the second local oscillator signal are not directed to the beam-emitting LIDAR pixel while the first local oscillator signal and the second local oscillator signal are directed to the second beam-emitting LIDAR pixel.

The term "processing logic" (e.g. processing logic 299 or processing logic 650) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I2C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A light detection and ranging (LIDAR) sensor comprising:
   a light source configured to emit a light beam, wherein at least a portion of the light beam forms a first local oscillator signal and a second local oscillator signal;
   a plurality of LIDAR pixels; and
   a local oscillator module coupled to the plurality of LIDAR pixels, the local oscillator module configured to receive a first local oscillator (LOS) signal and a second local oscillator (LOP) signal, the local oscillator module comprising a plurality of LOS output ports and a plurality of LOP output ports, wherein the LOS output ports are individually alternating with the LOP output ports, wherein an adjacent pair of a LOS output port of the plurality of LOS output ports and a LOP output port of the plurality of LOP output ports are configured to simultaneously output the LOS signal and the different LOP signal from the local oscillator module to a particular LIDAR pixel.

2. The LIDAR sensor of claim 1, wherein the local oscillator module is configured to selectively provide the first local oscillator signal and the second local oscillator signal to a beam-emitting LIDAR pixel of the plurality of LIDAR pixels.

3. The LIDAR sensor of claim 1, wherein the local oscillator module is configured to provide the first local oscillator signal to the plurality of LIDAR pixels by the plurality of LOS output ports and to provide the second local oscillator signal to the plurality of LIDAR pixels by the plurality of LOP output ports.

4. The LIDAR sensor of claim 1, the plurality of LIDAR pixels respectively comprising: (i) a first optical antenna configured to emit a transmit beam into a surrounding environment; and (ii) a second optical antenna configured to detect a return beam indicative of the transmit beam reflecting off an object in the surrounding environment.

5. The LIDAR sensor of claim 4, further comprising:
   a splitter configured to split the light beam into a transmit signal and a local oscillator signal;
   a transmit beam module configured to receive the transmit signal and coupled to the plurality of LIDAR pixels; and
   a polarizing module configured to receive the local oscillator signal and generate the first local oscillator signal and the second local oscillator signal.

6. The LIDAR sensor of claim 5, wherein the first local oscillator signal and the second local oscillator signal have a same polarization orientation.

7. The LIDAR sensor of claim 5, wherein the local oscillator signal and the second local oscillator signal have different polarization orientations.

8. The LIDAR sensor of claim 5, further comprising:
   one or more processors configured to simultaneously drive the transmit signal, the first local oscillator signal, and the second local oscillator signal to a particular LIDAR pixel of the plurality of LIDAR pixels one at a time to sequentially scan through the plurality of LIDAR pixels.

9. The LIDAR sensor of claim 8, further comprising:
   a power monitor coupled to the particular LIDAR pixel, the power monitor configured to detect a quantity of power in the transmit signal provided to the particular LIDAR pixel.

10. The LIDAR sensor of claim 8, wherein the one or more processors are configured to drive the transmit beam module to provide the transmit signal to the particular LIDAR pixel while the one or more processors drive the local oscillator module to provide the first local oscillator signal and the second local oscillator signal to the particular LIDAR pixel.

11. The LIDAR sensor of claim 8, wherein the particular LIDAR pixel includes:
    a first receiver configured to receive (i) a first polarization orientation of the return beam; and (ii) the first local oscillator signal from the local oscillator module; and
    a second receiver configured to receive (i) a second polarization orientation of the return beam; and (ii) the second local oscillator signal from the local oscillator module.

12. The LIDAR sensor of claim 11, wherein the second optical antenna includes a dual-polarization receive grating configured to (i) direct the first polarization orientation of the return beam to the first receiver; and (ii) direct the second polarization orientation of the return beam to the second receiver.

13. The LIDAR sensor of claim 11, wherein the second optical antenna includes:
   a first polarization receive grating configured to direct the first polarization orientation of the return beam to the first receiver, and
   a second polarization receive grating configured to direct the second polarization orientation of the return beam to the second receiver, wherein the first polarization receive grating is spaced apart from the second polarization receive grating.

14. The LIDAR sensor of claim 11, wherein the first receiver includes a first optical mixer, and wherein the second receiver includes a second optical mixer.

15. The LIDAR sensor of claim 1, wherein the local oscillator module includes a plurality of optical switches arranged in a multi-tiered configuration.

16. The LIDAR sensor of claim 15, wherein the multi-tiered configuration includes:
   a first group of the plurality of optical switches;
   a second group of the plurality of optical switches, the second group including more optical switches than the first group; and
   a third group of the plurality of optical switches, the third group including more optical switches than the second group.

17. The LIDAR sensor of claim 16, wherein:
   the first group includes one optical switch;
   the second group includes two optical switches; and
   the third group includes four optical switches.

18. An autonomous vehicle control system for an autonomous vehicle, the autonomous vehicle control system comprising:
   a light detection and ranging (LIDAR) sensor comprising:
      a light source configured to emit a light beam, wherein at least a portion of the light beam forms a first local oscillator signal and a second local oscillator signal;
      a plurality of LIDAR pixels; and
      a local oscillator module coupled to the plurality of LIDAR pixels, the local oscillator module configured to receive a first local oscillator (LOS) signal and a second local oscillator (LOP) signal, the local oscillator module comprising a plurality of LOS output ports and a plurality of LOP output ports, wherein the LOS output ports are individually alternating with the LOP output ports, wherein an adjacent pair of a LOS output port of the plurality of LOS output ports and a LOP output port of the plurality of LOP output ports are configured to simultaneously output the LOS signal and the different LOP signal from the local oscillator module to a particular LIDAR pixel.

19. The autonomous vehicle control system of claim 18, wherein the local oscillator module is configured to selectively provide the first local oscillator signal and the second local oscillator signal to a beam-emitting LIDAR pixel of the plurality of LIDAR pixels.

20. An autonomous vehicle comprising:
   a light detection and ranging (LIDAR) sensor including:
      a light source configured to emit a light beam, wherein at least a portion of the light beam forms a first local oscillator signal and a second local oscillator signal;
      a plurality of LIDAR pixels; and
      a local oscillator module coupled to the plurality of LIDAR pixels, the local oscillator module configured to receive a first local oscillator (LOS) signal and a second local oscillator (LOP) signal, the local oscillator module comprising a plurality of LOS output ports and a plurality of LOP output ports, wherein the LOS output ports are individually alternating with the LOP output ports, wherein an adjacent pair of a LOS output port of the plurality of LOS output ports and a LOP output port of the plurality of LOP output ports are configured to simultaneously output the LOS signal and the different LOP signal from the local oscillator module to a particular LIDAR pixel.

\* \* \* \* \*